(12) United States Patent
Hultin et al.

(10) Patent No.: US 7,364,763 B1
(45) Date of Patent: Apr. 29, 2008

(54) METHOD FOR SELECTIVE DELIVERY OF LIPID-SOLUBLE ANTIOXIDANTS INTO THE POLAR LIPID FRACTION OF A FOOD PRODUCT

(75) Inventors: Herbert O. Hultin, Rockport, MA (US); Halldor Sigfusson, Stillwater, OK (US); Marbelly A. Davila Cordido, Caracas (VE)

(73) Assignee: University of Massachusetts, Boston, MA (US)

( * ) Notice: Subject to any disclaimer, the term of this patent is extended or adjusted under 35 U.S.C. 154(b) by 398 days.

(21) Appl. No.: 10/111,939

(22) PCT Filed: Nov. 1, 2000

(86) PCT No.: PCT/US00/41746

§ 371 (c)(1),
(2), (4) Date: Nov. 25, 2002

(87) PCT Pub. No.: WO01/32040

PCT Pub. Date: May 10, 2001

Related U.S. Application Data

(60) Provisional application No. 60/162,645, filed on Nov. 1, 1999.

(51) Int. Cl.
    *A23L 3/00* (2006.01)
(52) U.S. Cl. ............... 426/541; 426/531; 426/601
(58) Field of Classification Search ............ 426/531, 426/541, 574, 601, 641, 654
    See application file for complete search history.

(56) References Cited

U.S. PATENT DOCUMENTS

| | | | | |
|---|---|---|---|---|
| 3,294,825 | A | * | 12/1966 | Pottier .................. 554/3 |
| 4,054,676 | A | * | 10/1977 | Weinshenker et al. ...... 426/546 |
| 5,492,709 | A | * | 2/1996 | Aeschbach et al. ......... 426/542 |

FOREIGN PATENT DOCUMENTS

| | | |
|---|---|---|
| DE | 753 794 | 8/1956 |
| EP | 0 687 419 | 12/1995 |
| JP | 409208949 | * 8/1997 |
| WO | 94/22322 | 10/1994 |

OTHER PUBLICATIONS

Barclay et al. "Partitioning and antioxidant action of the water-soluble antioxidant, Trolox, between the aqueous and lipid phases of phosphatidylcholine membranes: $^{14}C$ tracer and product studies." Biochim. Biophys. Acta (1995) 1237, 77-85.

Bloukas et al. "The influence of mincing and temperature of storage on the oxidation of pork back fat and its effect on water-and fat-binding in finely comminuted batters." Meat Sci. (1992) 32, 215-227.

Castle et al. "Inhibition kinetics of chain-breaking phenolic antioxidants in SDS micelles. Evidence that intermicellar diffusion rates may be rate-limiting for hydrophobic inhibitors such as α-tocopherol." J. Am. Chem. Soc. (1986) 108, 6381-6382.

Cornell et al. "Partition coefficients of some antioxidants in butteroil-water model system." J. Dairy Sci (1970) 53, 529-532.

Dawson et al. "Lipid oxidation in mechanically deboned poultry." Food Technol. (1983) 37 (7), 112-116.

Faustman et al. "Improvement of pigment and lipid stability in Holstein steer beef by dietary supplementation with vitamin E." J. Food Sci. (1989) 54, 858-862.

Faustman et al. "Vitamin E supplementation of Holstein steer diets improves sirloin steak color." J. Food Sci. (1989) 54, 485-486.

Faustman et al. "α-Tocopherol oxidation in beef and in bovine muscle microsomes." J. Agric. Food Chem. (1999) 47, 1396-1399.

Pikul et al. "Effect of total lipids, triacylglycerols and phospholipids on malonaldehyde content in different types of chicken muscles and the correcsponding skin." J. Food Biochem. (1989) 73, 409-427.

Pikul et al. "Relative role of phospholipids, triacylglycerols, and cholesterol esters on malonaldehyde formation in fat extracted from chicken meat." J. Food Sci. (1984) 49, 704-708.

Ross et al. "Membrane peroxidation: Inhibiting effects of water-soluble antioxidants on phospholipids of different charge types." Free Radical Biol. Med. (1994) 16, 779-788.

Swanson, et al. "Restructured Reindeer Steak Quality as Affected by Antioxidants and Frozen Storage." J. Food Sci. (1994) 50, 716-719.

Larsson, V K, Database Accession No. AN135708 (Submitted Apr. 16, 1986).

\* cited by examiner

*Primary Examiner*—Leslie Wong
(74) *Attorney, Agent, or Firm*—Fish & Richardson P.C.

(57) ABSTRACT

The invention relates to methods of reducing oxidation in foods by selectively adding one or more antioxidants to the polar lipid fraction of a food product.

19 Claims, No Drawings

METHOD FOR SELECTIVE DELIVERY OF LIPID-SOLUBLE ANTIOXIDANTS INTO THE POLAR LIPID FRACTION OF A FOOD PRODUCT

CROSS-REFERENCE TO RELATED APPLICATIONS

This application is the National Stage of International Application No. PCT/US00/41746, filed on Nov. 1, 2000, which claims the benefit of priority from U.S. Provisional Application Ser. No. 60/162,645, filed Nov. 1, 1999, the subject matter of both of which is incorporated herein by reference in its entirety.

STATEMENT AS TO FEDERALLY SPONSORED RESEARCH

This invention was made with Government support under United States Department of Agriculture grant #94-37500-0513. The Government has certain rights in this invention.

FIELD OF THE INVENTION

The invention relates to antioxidants and food processing.

BACKGROUND OF THE INVENTION

Many food products (e.g., ground or minced meat products such as bologna, paté, and sausages, and fish products such as surimi) are manufactured using muscle tissue of high lipid content or by adding fat to improved product texture. The total lipid content of the meat products may reach as high as 30-40% by weight of the food product. Fish products are generally of much lower lipid content (about 5% or lower). The higher the fat content of a food, the greater the concern that oxidation of the lipids, especially the membrane or polar lipids, will cause unpleasant colors and odors in the food. One means of preventing or decreasing lipid oxidation is to add an antioxidant to a food product. However, the chemical nature of many antioxidant compounds limits the distribution of these compounds into critical fractions of a food product, particularly in the polar lipid fraction.

SUMMARY OF THE INVENTION

The invention is based on the discovery that antioxidants can be selectively delivered into the polar lipid fraction of fatty foods by dissolving the antioxidant in a water-miscible solvent and then introducing the antioxidant into a food mixture prior to the addition of any fat. This result is possible because it has been discovered that, when an antioxidant is initially deposited into the polar lipid fraction of a mixture, the antioxidant tends to stay in that fraction. Similarly, when an antioxidant is initially deposited into the neutral lipid fraction of a mixture, the antioxidant tends to stay in that fraction.

Accordingly, the invention features a method of reducing oxidation of polar lipids in a food product by providing a composition (e.g., a liquid composition) containing a water-miscible solvent (e.g., ethanol, glycerol, propylene glycol, or a monoglyceride) and an antioxidant distributed (e.g., dissolved or suspended) in the water-miscible solvent; mixing the composition with a mixture to distribute the antioxidant throughout the mixture; and thereafter introducing lipids to the mixture to form a food product, thereby maintaining a concentration of the antioxidant in a polar lipid fraction of the food product sufficient to reduce oxidation of polar lipids relative to the oxidation in the absence of the antioxidant in the food product.

The method can further include removing lipids from the mixture prior to the mixing step. The concentration of the antioxidant in a polar lipid fraction of the food product is at least about 1.2 times (e.g., at least about 1.4, 1.6, or 1.8 times) the concentration of the antioxidant in a neutral lipid fraction of the food product. In addition, the mixing and introducing steps are performed while the temperatures of the composition and mixture are at about 5° C. or lower.

The food product and/or mixture can contain egg phospholipid, vegetable (e.g., vegetable granules, such as potato granules), flour, milk, legume, and/or animal muscle, such as ground beef, pork, chicken, turkey, or fish muscle.

The antioxidant can be a monohydric or polyhydric phenol, metal ion chelator, oxygen scavenger, or oxygen free-radical terminator, such as a tocopherol (e.g., $\delta$-tocopherol), carotenoid, ubiquinol, butylated hydroxyanisole, butylated hydroxytoluene, propyl gallate, or t-butylhydroquinone.

The invention further features a food product or edible composition made from a method of the invention. For example, the invention includes an edible composition having a polar lipid fraction, a neutral lipid fraction, and an antioxidant, where the concentration of the antioxidant in the polar lipid fraction is greater (e.g., about 1.2, 1.4, 1.6, 1.8 times greater) than the concentration of the antioxidant in the neutral lipid fraction.

A "polar lipid" is a lipid molecule that is charged and/or has part of the molecule compatible with water in the food products in which they reside. A "neutral lipid" is a lipid molecule that is not charged and is not compatible with water in the food products in which they reside.

A "water-miscible solvent" is any solvent having a dielectric constant of about 12 or higher. The dielectric constant of a solvent is determined by measuring the capacitance of a capacitor when it is filled with the solvent to be measured, and comparing that capacitance to the capacitance of the capacitor in a vacuum. See Bitter, *Currents, Fields, and Particles*, The Technology Press, Cambridge, Mass., p 68, 1952. However, for most solvents that are used in the invention, the dielectric constant will be known and readily available. Blending solvents will generally produce a dielectric constant approximately proportional to the quantities of the individual components added on a weight basis. See Pomeranz et al., *Food Analysis: Theory and Practice*, The AVI Publishing Co., Inc., Westport, Conn., p 292, 1971.

As used herein, an "antioxidant" is a molecule that partially or completely inhibits oxidation of polar or neutral lipids when present in a polar or neutral lipid fraction of a food product.

A "food product" is an edible material or its processing intermediate or precursor.

The methods of the invention provide a convenient means of ensuring that a relatively high concentration of antioxidant is present in the polar lipid fraction of a food product to defend against polar lipid oxidation. Such food products, therefore, are better protected against spoilage.

Unless otherwise defined, all technical and scientific terms used herein have the same meaning as commonly understood by one of ordinary skill in the art to which this invention belongs. Although suitable methods and materials for the practice or testing of the present invention are described below, other methods and materials similar or equivalent to those described herein, which are well known in the art, can also be used. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

The invention relates to methods of reducing lipid oxidation by selectively adding one or more antioxidants to a lipid fraction of a food product.

The polar lipids of fatty food products are generally more prone to oxidation than are the triacylglycerols (fats or oils) of whole muscle. The low oxidative stability is in large part due to incorporation of oxygen and a release of heme catalysts, degradative enzymes, and/or metallic ions due to cellular disruption during grinding or mincing. Ultimately, this leads to the formation of unpleasant odors, colors, flavors, coloration, changes in texture, and in some cases formation of potentially toxic compounds.

The polar membrane lipids of the muscle are considered more susceptible to oxidative deterioration than the neutral triacylglycerols (muscle storage lipids). This is due to the higher degree of unsaturation in polar lipids and the larger surface area of the membranes. In addition, some membranes, in particular the mitochondrial membranes and the sarcoplasmic reticular membranes, have been shown to stimulate lipid oxidation post-mortem. The dark (oxidative) muscle contains higher amounts of membrane lipids than the light (glycolytic) muscle, more pro-oxidants such as heme compounds, and more low molecular weight metal catalysts which can catalyze oxidation of muscle lipids. It is therefore important to inhibit or retard those deleterious changes accompanying oxidation by adding antioxidants. The antioxidants commonly added are lipid-soluble, sometimes in conjunction with synergistic water-soluble antioxidants, e.g., tocopherol and ascorbate.

The efficiency of a particular antioxidant is related to its particular location within the product. Oxidation is considered to occur at the lipid-water interface, and it is therefore of particular importance that the antioxidant is placed at or near the origin of initiation and/or propagation for optimal protection against oxidation. This invention provides a means of selectively introducing antioxidants into such locations.

Specific details regarding materials and methods for use in the practice of the invention can be found in Sigfusson, "Partitioning of an Exogenous Lipid-Soluble Antioxidant Between the Neutral and Polar Lipids of Minced Muscle," Doctoral Dissertation in Food Science, Graduate School of the University of Massachusetts, Amherst, Mass., 1999; and references cited therein.

Antioxidants

Numerous natural and synthetic compounds are known to possess antioxidative characteristics, most of which are monohydric or polyhydric phenols with various ring substitutions. The three main groups of antioxidants, which are categorized according to their mode of action, include oxygen free-radical terminators, chelators of metal ions that can catalyze lipid oxidation, and oxygen scavengers that react with oxygen in closed systems. For further details, see Shahidi et al., Crit. Rev. Food Sci. Nutr. 31:67-103, 1992; and Giese, Food Technol. 50:73-80, 1996. The first class of antioxidants rapidly donate a hydrogen atom to a lipid free radical to form a relatively stable antioxidant radical. This radical is incapable of initiating or propagating the chain reaction, thereby terminating oxidation. The naturally occurring free-radical terminators include three major classes of compounds: the tocopherols, carotenoids, and ubiquinols, all of which are lipid soluble. The tocopherols and ubiquinols are polyphenolic compounds widely distributed in animal and plant tissues. The synthetic free-radical terminators currently approved for use in foods by the United States Food and Drug Administration include butylated hydroxyanisole (BHA), butylated hydroxytoluene (BHT), propyl gallate (PG) and t-butylhydroquinone (TBHQ).

One class of antioxidants that are particularly useful in the invention is vitamin E, i.e., tocopherol and tocotrienol derivatives of 6-chromanol, as described in Kasparek, "Chemistry of tocopherols and tocotrienols," In: *Vitamin E: A comprehensive treatise*, pp 7-66, Marcel Dekker, New York, 1980. The eight known compounds bearing vitamin E activity (Serbinova et al., Methods Enzymol. 234:354-366, 1994) have a six-membered chromanol ring and a side chain consisting of three terpene units. The side chain of the tocopherol group is saturated, whereas the side chain of the tocotrienol group is unsaturated, with double bonds between carbons 3' and 4', 7' and 8', and 11' and 12'. Four natural forms exist within each group, the $\alpha$-, $\beta$-, $\gamma$- and $\delta$-tocopherols and tocotrienols. These molecules differ in number and position of methyl groups on the chromanol ring. The $\alpha$-tocopherol has three methyl groups, the $\beta$- and $\gamma$-tocopherols have two methyl groups, and the $\delta$-tocopherol has only one methyl group.

The tocopherols are light-orange and liquid at room temperature. The melting points of the natural $\alpha$- and $\gamma$-tocopherols are 2.5-3.5° C. and −3 to −2° C., respectively. These compounds are more stable to heat and alkali in the absence of oxidizing agents, and generally more stable in acid than in alkali. The tocopherols are much more stable to visible light than to ultraviolet light and are readily oxidized in the presence of metals. Thus, the addition of metal chelators significantly improves their antioxidant activity. In the absence of oxygen, $\alpha$-tocopherol is stable to heat treatment up to 200° C. Consequently, $\alpha$-tocopherol can function as an antioxidant in many foods products that are cooked or heated.

Isolation of Lipid Fractions and Detection of Antioxidants

The invention is based on the localization of antioxidants into the polar versus the neutral lipid fractions of a food product. Thus, to ensure that antioxidants are deposited in the intended fraction, one may need to assess the amount of antioxidants in the lipid fractions of a food product.

Differential ultracentrifugation methods are most widely employed for the isolation of membranes or subcellular particles from tissue homogenates (Fleischer et al., JAOCS 42:588-606, 1965; and Evans, "Organelles and membranes of animal cells," In: *Biological Membranes: A Practical Approach*, pp 1-35, IRL Press, Oxford, UK, 1982). In short, the muscle is first homogenized in several volumes of buffer to form a suspension. This suspension is then subjected to differential ultracentrifugation, so that separation of the cell particles is obtained based on differences in their sedimentation rate. The size, shape and density of the particles determine the sedimentation rate. Fractions containing, e.g. nuclei, mitochondria, and microsomes, are thus obtained by sequentially increasing the g-force.

Phosphate-, histidine-, or the Good buffers are usually favored for membrane preparations because these buffers are especially effective in a muscle mixture with a pH of 7.2-7.5. Such pH values are desired to maintain a net negative charge at the membrane surface so that repulsive forces keep the membranes suspended during the first centrifugation step. The first centrifugation step is at a relatively low speed (e.g., 600 g to 5000 g), so that large components such as muscle fragments and unbroken cells sediment to form a pellet at the bottom of the centrifuge tube. This is followed by centrifugation at progressively higher speed and for longer times to sediment different subcellular components. The high g-force in these subsequent centrifugation steps overcomes any repulsive forces due to membrane surface charge, so the membranes sediment. The isolation procedure can involve several centrifugation steps for isolation and purification of the membrane(s) of interest, and the process may take a day or more.

A sucrose or cesium chloride gradient can also be used, where the cellular components are separated based on their buoyant density, independent of their size and shape. This method is more sensitive and can, for example, separate cell components containing heavy isotopes (e.g., $^{13}C$ or $^{15}N$) from those which do not.

Efficient extraction of the lipid classes under investigation, both qualitative and quantitative, is often necessary to determine antioxidant amounts delivered into these lipid classes. The choice of extraction method depends on the specific requirements of the user and the properties of the sample to be extracted. When choosing a suitable extraction method, several parameters must be considered, including solvent toxicity, convenience, speed, efficiency of extraction, and suitability for the intended sample sizes.

For efficient extraction of lipids from muscle foods, the bonding (via hydrophobic, water repulsion, van der Waals, electrostatic, or covalent bonds) of the lipids to other food components should be disrupted. Water is strongly bonded to proteins and carbohydrates and stabilizes lipoprotein molecules. Thus, in aqueous food systems, the non-polar lipids are shielded from the non-polar solvents. The covalent bonds can be ruptured enzymatically or by acid or base hydrolysis prior to solvent extraction. The hydrophobic and van der Waals bonds are easily broken with non-polar solvents, while the disruption of electrostatic bonds requires a polar solvent. Therefore, for muscle tissue, the neutral lipids (triacylglycerols) existing as large fat droplets in the storage (adipose) tissue are extracted with relative ease, while the components of the cell membranes (phospholipids, cholesterol, etc.) are more difficult to extract. In this case the solvent must penetrate the muscle to come into contact with the membrane lipids. This is achieved by using a polar solvent such as an alcohol, as non-polar solvents tend to dehydrate the tissue, resulting in hard, unpenetratable protein and polysaccharide particles. The alcohols commonly used are methanol, ethanol and isopropanol, in order of decreasing polarity. Then, a relatively non-polar solvent is used to extract the lipids released by the polar solvent. Accordingly, methods using only the non-polar solvent hexane have been shown to give lower lipid recoveries than those obtained using polar solvents. As a result, a combination of polar- and non-polar solvents can be used for the most effective extraction of tissue lipids.

The methods most frequently used for extraction of lipids are modifications of the chloroform-methanol procedure described in Folch et al., J. Biol. Chem. 37:497-509, 1957, e.g., the methods described in Bligh et al., Can. J. Biochem. Physiol. 37:911-917, 1959; and Lee et al., J. AOAC Intl. 79:487-492, 1996.

For example, the separation and isolation of the neutral and polar lipid fractions of chicken meat can be carried out as follows. Minced chicken leg muscle is centrifuged at 20 to 40° C. (e.g., 35° C.) for 10 minutes to 2 hours (e.g., 30 minutes) at 100,000 to 150,000 g (e.g., 130,000 g). At this temperature the chicken depot fat is predominantly in the liquid (oil) state, thus facilitating the floating of the oil to the top of the centrifuge tube. The oil is then collected and re-centrifuged for 1 to 10 minutes (e.g., 5 minutes) at full speed in a tabletop centrifuge for further purification. Typical neutral lipid yields from minced chicken leg muscle can vary from 11-94%, generally increasing as the total lipid content of the muscle increases. The neutral lipid (NL) content of the muscle can be estimated as the difference between the total lipid (TL) content and the phospholipid (PL) content (NL=TL−PL). The neutral lipid yield depends on the duration of muscle mincing and on the centrifugation temperature. Increasing the mincing time results in lower yields, probably due to the formation of a lipid-protein emulsion. Increasing the temperature results in higher neutral lipid yields. A higher temperature (e.g., 35° C.) and a higher centrifugal force (e.g., 130,000 g) can lead to higher neutral lipid yields. Phospholipids are usually not detected in the oil. Thus, the antioxidant determined in the oil isolated in the above manner represents the antioxidant associated with the neutral lipids. The polar lipids are collected with the membranes as a pellet in the centrifuge tube, and subsequently the lipids are extracted as described above.

Having isolated the lipid fractions, the detection of particular antioxidant molecules are within ordinary skill in the art of food chemistry. For example, the separation and detection of the tocopherols have been described in Parrish, Crit. Rev. Food Sci. Nutr. 13:161-187, 1980; de Leenheer et al., J. Chromatogr. 429:3-58, 1988; and Lang et al., "Vitamin E," In: *Modern chromatographic analysis of vitamins*, pp 153-195, Marcel Dekkar, New York, 1992. High performance liquid chromatography (HPLC) methods are generally suitable and have several advantages. These methods offer higher precision than thin-layer chromatography (TLC) methods, are less labor intensive, can be automated, require less sample cleanup and lower temperatures, and have shorter separation times on the column. Normal-phase HPLC columns (silica stationary phase) employing an organic mobile phase provide more selectivity and are generally superior for the separation of various tocopherols, in spite of requiring longer equilibrium times and performing with less consistency than reversed-phase HPLC columns.

Traditionally, absorption and fluorescence have been used for detecting of the tocopherols. Fluorescence detection offers increased sensitivity and selectivity. The tocopherols exhibit native fluorescence at excitation wavelengths of 205 and 295 nm, and an emission wavelength of 330 nm.

Addition of Antioxidant to Food Products

Antioxidants suitable for food products are well known in the art, as discussed above. In the U.S., the amount of added antioxidant that can be present in commercial food products is regulated by the Food and Drug Administration (FDA). In general, a maximum of 200 parts per million (ppm) antioxidant in the fat portion of a food is allowable. An exception to this rule is that a tocopherol can be present in a concentration of up to 300 ppm in the fat. Given these regulatory considerations, it is especially important to deliver the antioxidant into the fraction of the food (i.e., the neutral or polar lipid fraction) which is most susceptible to oxidation or spoilage. Thus, in accordance with the present invention, the amount of antioxidant that is delivered into a polar lipid fraction can be about 50 to 400 ppm (e.g., 100 to 300 ppm).

In general, an antioxidant in any suitable solvent can be introduced into a food product. The nature of the solvent will depend on whether it is desirable to selectively deliver the antioxidant to the neutral or polar lipid fractions of a food product (e.g., a mixture containing animal muscle). As discussed above, it is generally desirable to selectively deliver antioxidants to the polar lipid fraction because it is the oxidation of polar lipids that is often most responsible for the unpleasant odors, colors, and tastes associated with spoilage.

Since the neutral lipids are different from the polar lipids, the best antioxidant for the neutral lipid fraction is often different from the best antioxidant for the polar lipid fraction. Thus, in some cases, it is important to deliver an antioxidant to the neutral lipid fraction that is different from the antioxidant delivered to the polar lipid fraction. When selective delivery of an antioxidant to the neutral lipid fraction is desired, the antioxidant is dispersed in a hydrophobic solvent (i.e., a solvent having a dielectric constant of less than 12) and the dissolved antioxidant added to the food product. In contrast, when selective delivery of an antioxidant to the polar lipid fraction of a food product is desired, the antioxidant is dispersed in a water-miscible solvent (i.e., a solvent having a dielectric constant of 12 or greater). In dealing with a product in which some of the neutral lipid can be added after the antioxidant, the addition of the antioxidant dispersed in a water-miscible solvent before the addition of the lipids will improve the uptake of the antioxidant into the membrane lipids. Examples of organic solvents include vegetable oil, olive oil, and animal fats. Examples of water-miscible solvents include ethanol, glycerol, propylene glycol, and a monoglyceride.

Food products that can be treated by the methods of the invention include salad dressings (e.g., mayonnaise [i.e., a mixture of oil and egg phospholipids]), dehydrated vegetables (e.g., potato granules), doughs (e.g., pastry crusts, breads, cakes, cookies, crackers, and the like), soy products (e.g., tofu), dairy products (e.g., milk, cheese, yogurt, and the like), peanut butter, and mashed legumes (e.g., mashed beans, mashed peas, and hummus). In accordance with the invention, antioxidants can be added to each of these food products and intermediates thereof.

The animal muscle mixture to which an antioxidant is added can be any edible animal muscle, such as a beef steak, pork chop, or chicken thigh. However, the methods of the invention are particularly useful for macerated, chopped, or ground beef, pork, chicken, turkey, or fish, since the mechanical manipulation of such animal muscle will increase the surface area of the animal muscle that is exposed to air (i.e., oxygen). It is under such circumstances that the addition of an antioxidant to the polar lipid fraction of the mixture will be especially useful.

The invention will be further described in the following examples, which do not limit the scope of the invention defined by the claims.

EXAMPLES 1

The objective of this experiment is to determine the distribution of the antioxidant δ-tocopherol in various lipid fractions and to determine if the distribution is affected when the antioxidant is added to the muscle before or after adding fat.

Two treatments were evaluated. In the control treatment, δ-tocopherol was added to a mixture containing muscle and fat. In the sample experiment, δ-tocopherol was added to an aqueous muscle mixture first, then the fat added to the mixture. Quantitative determinations of lipid and δ-tocopherol content were determined using the methods described in Sigfusson, "Partitioning of an Exogenous Lipid-Soluble Antioxidant Between the Neutral and Polar Lipids of Minced Muscle," Doctoral Dissertation in Food Science, Graduate School of the University of Massachusetts, Amherst, Mass., 1999.

Chicken leg muscle was cleaned from visible fat and other muscle components, such as tendon. The muscle was double ground and stored in the cool room until the next day. The chicken fat was cut into small pieces and also stored in a cool room until the next day.

The next day, 500 g ground muscle were mixed with 50 ml of a solution containing 20 mg/ml sodium ascorbate and 0.5 mg/ml nagarse for one minute to separate the membranes from the cytoskeletal proteins. The mixture was chopped in a metallic chopper for 30 seconds, stopped, the mixture mixed with a spatula, and the chopper activated for another 30 seconds, thereby forming a paste. The paste was divided and placed in two plastic beakers and let sit for 1.5 hours.

To determine the total lipids in whole chicken leg muscle, two 5 g samples of the paste were divided out, and the total lipid (TL) determined, with the following results.

| Sample Weight (g) | Beaker No. | TL (%) |
| --- | --- | --- |
| 5.22 | 1 | 3.48 |
| 5.22 | 2 | 3.24 |
| 5.13 | 1 | 3.32 |
| 5.13 | 2 | 3.47 |

From the above data, the average TL content was 3.38±0.12% for chicken leg muscle.

The treated muscle paste was divided into two masses of 224 g each. According to the calculation above, each mass should contain 7.57 g of fat. To artificially make a 10% fat mixture, 14.83 g (6.62% of 224 g) chicken fat was added to one of the two masses to serve as the control experiment.

The amount of δ-tocopherol to be added was calculated from the concentration of the δ-tocopherol stock solution, which was 1.866 µg/µl. Thus, to achieve a concentration of 300 ppm (in fat), about 1608 µl was added to the control and sample mixtures. All δ-tocopherol samples were in ethanol solution.

The control mixture was prepared by cooling a 224 g mass of paste in a cold room, then transferring the 224 g mass to a metallic chopper. About 14.8 g of chicken fat was then added to the paste, and the resulting mixture chopped for a total of 40 seconds in two intervals. δ-Tocopherol was then added, and the mixture chopped for a total of 30 seconds in two 15-second intervals. The sample mixture was prepared as described for the control mixture, except that δ-tocopherol was added to the paste before addition of chicken fat. Both the control and sample mixtures were then removed from the chopper and divided for subsequent determinations.

The control and sample mixtures were analyzed for total lipids, lipid phosphorus (used for calculating phospholipid content), tocopherol, and protein content. Neutral lipid was taken as the difference between the masses of total lipids and phospholipids. These determinations were made on the starting raw material described above, as well as isolated membrane fractions. The results are presented in Table 1. Other components of the various mixtures were also determined. Neutral lipids (NL) was determined in two 100 ml aliquots as described above. The total amount of muscle used to isolate NL was 100 g in both cases. The results are presented in Tables 2 and 3.

TABLE 1

| Starting Material | Control | Sample |
|---|---|---|
| Total lipid content (%) | 8.42 ± 0.55 | 8.14 ± 0.35 |
| Phospholipids (%) | 0.782 ± 0.113 | 0.908 ± 0.264 |
| Neutral Lipids (%) | 7.64 | 7.23 |
| Protein (g) | 47.58 ± 0.82 | 36.67 ± 7.97 |
| µg δ-tocopherol added (ppm) [A] | 2616.7 (310.77) | 2618.1 (321.75) |
| µg δ-tocopherol in TL (ppm) [B] | 1760.85 ± 157.21 (209.97) | 1588.62 ± 157.21 (196.03) |
| µg δ-tocopherol recovered (%) [B/A] | 67.3 | 60.1 |

TABLE 2

| Membrane Preparation | Control | Sample |
|---|---|---|
| Total lipid content (mg) | 213 ± 0.01 | 242 ± 0.09 |
| Phospholipids (mg) | 159.70 ± 25.94 | 142.06 ± 29.61 |
| Protein (mg) | 20.7 ± 1.1 | 24.2 ± 0.9 |
| µg δ-tocopherol in sediment (ppm) | 19.63 ± 0.21 (92.16) | 42.95 ± 0.24 (177.5) |

TABLE 3

| Ratio | Control | Sample |
|---|---|---|
| $PL_{sed}/PL_{initial}$ | 0.20 | 0.16 |
| $PL_{sed}/TL_{sed}$ | 0.75 | 0.59 |
| $PL_{sed}(TL_{sed} + Prot_{sed})$ | 0.68 | 0.53 |

The data in Tables 1 and 2 indicate that, when the antioxidant δ-tocopherol is added in ethanol prior to the addition of fat ("Sample"), the antioxidant was preferentially delivered to the membrane or polar lipid fraction of the animal muscle mixtures, in this case almost twice as much as in the neutral lipids. The data in Table 3, as well as in the other Tables, confirm that there was little difference in the efficiency of lipid isolation between the control and sample groups.

EXAMPLE 2

To determine whether the specificity of antioxidant distribution was reproducible, a second independent experiment was performed as follows.

Live chickens were obtained from Longwood Chicken Farms, Reading, Mass. Chicken meat was purchased from Star Market, Gloucester, Mass. Sodium salt of L-ascorbic acid, bovine serum albumin, HEPES buffer, nagarse type XXVII protease, sodium chloride, sodium hydroxide, dibasic sodium phosphate, and δ-tocopherol (90% pure) were obtained from Sigma Chemical Co., St. Louis, Mo. δ-Tocopherol (94% pure) for standard curve determinations was obtained from Supelco, Inc., Bellefonte, Pa. Ammonium molybdate, cupric sulfate, chloroform, hexane, hydrogen peroxide solution (30%), methanol, 2-propanol, sodium deoxycholate, sodium potassium tartrate, Whatman filter paper #4 (11 cm diameter), and Whatman polytetrafluoroethyl acetate membrane filters (0.45 µm pore size) were obtained from Fisher Scientific, Pittsburgh, Pa. Potassium chloride was obtained from J. T. Baker, Inc., Phillipsburg, Pa. Absolute ethanol was obtained from Pharmaco Products, Inc., Bayonne, N.J.

Live chickens were sacrificed by asphyxiation using carbon dioxide. The skin was removed, and the legs cut and washed with cold water. Legs obtained from either live or supermarket chickens were deboned and trimmed of fat and tendons. The clean muscle was stored under nitrogen and on ice overnight. The following day, the muscle was ground twice through 5 mm perforations in a Kitchen Aid model KSM90 grinder (300 W) at full speed and kept on ice during this study.

Chicken fat was obtained from retail chicken products or in some cases from live chickens. For some experiments, the chicken fat was heated in a water bath at 35° C. for 45 minutes to obtain oil. The oil was then centrifuged in a tabletop centrifuge to remove small pieces of collagen. In other experiments, solid chicken fat was used.

A solution of sodium ascorbate (20 mg/ml) and nagarse (0.05 mg/ml) in double distilled water was prepared and immediately added to ground muscle (1:10 solution:muscle ratio). The muscle was then chopped for 20 seconds in an Oskar Sunbeam model 4817 food processor. Three 5 g samples were taken from the chopped mixture to determine total lipid content. The chopped muscle was transferred to a plastic beaker and stored under nitrogen for at least 1 hour in the cold room (4° C.).

Meanwhile, a stock solution of δ-tocopherol was prepared by dissolving 100 µl of δ-tocopherol standard in 9.9 ml of ethanol, and diluting again with ethanol to achieve a concentration of about 4.5 mM. One hundred microliters of δ-tocopherol stock solution were diluted to 4 ml with chloroform, and a 20 µl volume of the chloroform mixture was injected into an HPLC to establish a standard signal corresponding to about 300 ppm δ-tocopherol.

Two samples were prepared for this study. To one sample, δ-tocopherol was added to the muscle mixture first, then the fat/oil was added. This sample was designated "AO." In the second sample, the fat was added before the addition of δ-tocopherol. This sample was designated "FAT." δ-Tocopherol was mixed with the muscle mixture by chopping for 40 seconds, and the fat was mixed with the muscle mixture by chopping for 2 minutes. Samples were analyzed for total lipids, phospholipids, protein, moisture, δ-tocopherol content, and pH.

Polar lipids were isolated as described in Sigfusson, "Partitioning of an Exogenous Lipid-Soluble Antioxidant Between the Neutral and Polar Lipids of Minced Muscle," Doctoral Dissertation in Food Science, Graduate School of the University of Massachusetts, Amherst, Mass., 1999. One part of the prepared sample was homogenized for 1 minute with four parts of cold HEPES buffer (0.1 M, pH 7.5) containing 0.2% (w/v) sodium ascorbate in a polytron Kinematica GmbH Type PT 10/35 (Brinkmann Instruments, Westbury, N.Y.) connected to a speed control set at 76. The homogenate was then centrifuged at 10,000 g for 20 minutes at 5° C. in a Beckman L8-55M ultracentrifuge. The supernatant was re-centrifuged at 130,000 g for 30 minutes at 5° C. The sediment formed, which consisted primarily of tissue membranes, was then suspended in a small amount of buffer solution and extracted with 10 volumes of cold 1:1 chloroform:methanol. Total neutral and phospholipids and tocopherol were determined in this fraction. Another aliquot of the membrane was evaluated for protein content.

The neutral lipids were isolated by centrifuging 50 g muscle samples at 130,000 g for 30 minutes at 35-40° C. Tocopherol content in the neutral lipid was also determined. Total lipid, neutral lipid, and tocopherol content were determined on the starting raw materials as described above.

The distribution of δ-tocopherol between the polar and neutral lipids was determined for the AO and FAT samples and summarized in Table 4 below.

TABLE 4

|  | AO Samples | FAT Samples |
|---|---|---|
| µg δ-tocopherol/g total lipid | 307 ± 16 | 287 ± 15 |
| µg δ-tocopherol/g polar lipid | 390 ± 79 | 200 ± 7 |
| µg δ-tocopherol/g neutral lipid | 208 ± 28 | 286 ± 1 |
| ratio of δ-tocopherol concentration in polar lipids to δ-tocopherol concentration in total lipids | 1.26 ± 0.20 | 0.70 ± 0.06 |
| ratio of δ-tocopherol concentration in neutral lipids to δ-tocopherol concentration in total lipids | 0.68 ± 0.06 | 1.00 ± 0.05 |
| ratio of δ-tocopherol concentration in polar lipids to δ-tocopherol concentration in neutral lipids | 1.87 ± 0.22 | 0.70 ± 0.02 |

The data in Table 4 confirms the findings in Example 1; namely, that adding the antioxidant δ-tocopherol before addition of fat leads to increased concentration of the antioxidant in the polar lipids (the phospholipids), while the addition of the antioxidant after the addition of fat keeps most of the tocopherol in the neutral lipids. The first row of data in Table 4 gives the concentration of tocopherol in the total lipid of the muscle samples. Both samples were adjusted to about 300 ppm. The second row gives the tocopherol content calculated on the basis of the amount of polar lipids in the membrane fraction, and the third row is the amount of tocopherol in the neutral lipid that was isolated separately. In the samples in which the antioxidant was added first, there were an increase in the tocopherol concentration in the polar lipids and a decrease of tocopherol in the neutral lipids. In the samples in which fat or oil was added first, there was a decrease in the relative amount of tocopherol in the polar lipids, compared to that of the starting total lipids. Little change in the antioxidant concentration in the neutral lipids was observed, relative to the changes observed in the polar lipids, because of the large amount of neutral lipids compared to the relatively small amount of polar lipid in the sample. Indeed, the ratio of antioxidant concentration in the polar lipids and neutral lipids inverts from 1.87 to 0.70 when the antioxidant is added after the addition of fat instead of before the addition of fat.

When the antioxidant was dispersed in chicken fat added to the meat sample, the ratio of δ-tocopherol concentration in polar lipids to δ-tocopherol concentration in neutral lipids was about 0.15.

The above results indicate that the relative concentration of antioxidant in various lipid fractions of a food product containing animal muscle can be manipulated by using different antioxidant solvents and by adding the antioxidant either before or after the addition of fat to the product.

OTHER EMBODIMENTS

It is to be understood that while the invention has been described in conjunction with the detailed description thereof, the foregoing description is intended to illustrate and not limit the scope of the invention, which is defined by the scope of the claims. Other aspects, advantages, and modifications are within the scope of the following claims.

What is claimed is:

1. A method of reducing oxidation of polar lipids in a food product, the method comprising:
   providing a composition comprising a water-miscible solvent and an antioxidant distributed in the water-miscible solvent;
   providing a mixture comprising a polar lipid fraction;
   delivering the antioxidant to the polar lipid fraction by combining the composition with the mixture; and
   introducing additional lipids to the mixture to form a food product that comprises a greater concentration of antioxidant in the polar lipid fraction relative to the concentration of antioxidant in a neutral lipid fraction of the food product.

2. The method of claim 1, further comprising removing lipids from the mixture prior to the delivering step.

3. The method of claim 1, wherein, after the introducing step, the concentration of the antioxidant in a polar fraction of the food product is at least about 1.2 times the concentration of the antioxidant in the neutral lipid of the food product.

4. The method of claim 3, wherein, after the introducing step, the concentration of the antioxidant in a polar lipid fraction of the food product is at least about 1.4 times the concentration of the antioxidant in the neutral lipid fraction of the food product.

5. The method of claim 4, wherein, after the introducing step, the concentration of the antioxidant in a polar lipid fraction of the food product is at least about 1.6 times the concentration of the antioxidant in the neutral lipid fraction of the food product.

6. The method of claim 5, wherein, after the introducing step, the concentration of the antioxidant in a polar lipid fraction of the food product is at least about 1.8 times the concentration of the antioxidant in the neutral lipid fraction of the food product.

7. The method of claim 1, wherein the delivering and introducing steps are performed while the temperatures of the composition and mixture are at 5° C. or lower.

8. The method of claim 1, wherein the food product comprises animal muscle.

9. The method of claim 8, wherein the animal muscle is fish, chicken, beef, pork or turkey muscle.

10. The method of claim 1, wherein the food product comprises an egg phospholipid, vegetable, flour, milk, or legume.

11. The method of claim 1, wherein the water-miscible solvent is ethanol, glycerol, propylene glycol, or a monoglyceride.

12. The method of claim 1, wherein the antioxidant is a monohydric or polyhydric phenol.

13. The method of claim 1, wherein the antioxidant is a metal ion chelator.

14. The method of claim 1, wherein the antioxidant is an oxygen scavenger.

15. The method of claim 1, wherein the antioxidant is an oxygen free-radical terminator.

16. The method of claim 15, wherein the antioxidant is a tocopherol, carotenoid, ubiquinol, butylated hydroxyanisole, butylated hydroxytoluene, propyl gallate, or t-butylhydroquinone.

17. The method of claim 16, wherein the antioxidant is tocopherol.

18. The method of claim 1, wherein the concentration of the antioxidant in the polar lipid fraction of the food product is from about 50 ppm to about 400 ppm.

19. The method of claim 1, wherein the concentration of the antioxidant in the polar fraction of the food product is from about 100 ppm to about 300 ppm.

* * * * *

UNITED STATES PATENT AND TRADEMARK OFFICE
CERTIFICATE OF CORRECTION

| | | |
|---|---|---|
| PATENT NO. | : 7,364,763 B1 | Page 1 of 1 |
| APPLICATION NO. | : 10/111939 | |
| DATED | : April 29, 2008 | |
| INVENTOR(S) | : Herbert O. Hultin, Halldor Sigfusson and Marbelly A. Davila Cordido | |

It is certified that error appears in the above-identified patent and that said Letters Patent is hereby corrected as shown below:

Title Page, OTHER PUBLICATIONS, reference Pikul et al.:
 delete "correcsponding" and replace with --corresponding--

Page 5, Column 12, Claim 3; line 34;
 delete "polar fraction" and replace with --polar lipid fraction--

Page 5, Column 12, Claim 3; line 36;
 delete "neutral lipid" and replace with --neutral lipid fraction--

Page 6, Column 14, Claim 19; line 7;
 delete "polar fraction" and replace with --polar lipid fraction--

Signed and Sealed this

Twenty-ninth Day of July, 2008

JON W. DUDAS
*Director of the United States Patent and Trademark Office*